United States Patent Office 3,066,105
Patented Nov. 27, 1962

3,066,105
INK COMPOSITIONS
Edward A. McCafferty, Cincinnati, Ohio, assignor to The National Marketing Machine Company, a corporation
No Drawing. Original application July 15, 1960, Ser. No. 42,959. Divided and this application May 2, 1961, Ser. No. 108,229
28 Claims. (Cl. 252—301.2)

This invention relates to compounds which are characterized by fluorescent properties in ultraviolet light. More specifically, this invention relates to compounds which are colorless in ordinary light and distinctively fluorescent in ultraviolet light so as to render them particularly suitable as a means for marking various materials whereby the marking is normally invisible but easily detectable when subjected to ultraviolet illumination.

It has been proposed to effect a marking on various materials which is invisible in ordinary light yet detectable under special lighting conditions, such as under ultraviolet light. Materials which have been marked in such a manner have included paper, certain textiles, and the like.

Although prior art compounds have generally proven satisfactory when employed to effect markings on materials which do not exhibit any ultraviolet reflective properties, these compounds generally have not provided a sufficient color contrast when applied to materials previously treated with ultraviolet fluorescent substances. In such instances the markings are not clearly distinguishable and therefore unsatisfactory.

The utilization of compounds which fluoresce blue in ultraviolet light has become widespread in the paper, textile, and similar industries to provide a product having a whiter appearance in ordinary light. However, such whitening compounds, commonly known as optical brighteners, cause the materials to which they are applied to be characterized by an intense blue color when irradiated solely with ultraviolet light. Prior art marking materials often are obliterated by the background fluorescence. Therefore, the art has attempted to provide compounds which by virtue of their color in ultraviolet light provide readily detectable markings on materials which themselves display ultraviolet fluorescent properties.

In addition to providing color contrast, compounds utilized for ultraviolet fluorescent markings must be stable under the conditions which the base material normally may be expected to encounter. Stability may not be a problem when the base materials are subjected only to mild conditions. However, when the marked materials are subjected to severe conditions such as relatively high temperatures and/or chemical treatment, the requirements for a marking compound become more stringent. For example, laundry normally is subjected to temperatures ranging up to about 375° F. and to a slight caustic treatment in commercial cleaning processes. In order for a fluorescent marking compound to be effective it must be stable under these conditions. Specifically, suitable marking compounds must not decompose or sublime in this temperature range and must be resistant to attack by alkalies. Many known fluorescent compounds are not suitable for such applications.

Derivatives of 2-phenyl benzoxazole and 2-phenyl benzothiazole are known to be characterized by fluorescent properties in ultraviolet light and some derivatives have been suggested as marking materials. However, by virtue of their color in ultraviolet light or their lack of stability under certain conditions, many such derivatives have not proven to be satisfactory, particularly when employed in laundry marking ink formulations.

Accordingly, it is the primary object of this invention to provide normally colorless compounds which are characterized by distinctive colors in ultraviolet light.

It is another object of this invention to provide normally colorless compounds which are characterized by a distinctive intense yellow to orange color in ultraviolet light.

It is a specific object of this invention to provide normally colorless compounds which are characterized by distinctive colors in ultraviolet light and by other properties rendering them particularly suitable for certain applications.

It is another specific object of this invention to provide normally colorless compounds useful as fluorescent pigments which are characterized by non-subliming and alkali-resistant properties.

It is an additional specific object of this invention to provide normally colorless compounds useful as fluorescent pigments which are adapted for utilization in laundry marking inks and the like by virtue of their distinctive color in ultraviolet light and their stability when subjected to the conditions normally encountered in laundering operations.

In accordance with the present invention there is provided a normally colorless compound which fluoresces in ultraviolet light and is represented by the formula:

(I) 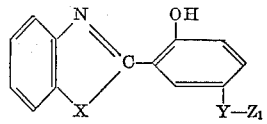

wherein X represents an atom selected from the group consisting of oxygen and sulfur atoms, and $Z_1$ represents a radical selected from the group consisting of (a) hydrogen,
(b) an aliphatic group having from 1 to 8 carbon atoms in the carbon chain, and
(c) a radical represented by the formula (II) 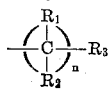

wherein $n$ is a number selected from the group consisting of 0 and 1. $R_1$ represents a radical selected from the group comprising hydrogen and an aromatic group containing not more than 2 benzene nuclei, $R_2$ represents a radical selected from the group comprising hydrogen, an aliphatic group having from 1 to 7 carbon atoms in the carbon chain, and an aromatic group containing not more than 2 benzene nuclei, and $R_3$ represents an aromatic group containing not more than 2 bezene nuclei, and Y represents a radical selected from the group consisting of —NHCO— and —NHCONZ$_2$—, wherein $Z_2$ represents a radical selected from the group consisting of hydrogen and $Z_1$.

More specifically, in accordance with the present invention there is provided an ink composition comprising a compound represented by Formula I and a suitable organic carrier.

The terminal portion $Z_1$ of the amido and ureido groups represented by Y—$Z_1$ in Formula I may consist of an aliphatic group having from 1 to 8, preferably from 1 to 6, carbon atoms in a saturated carbon chain. The carbon chain may be either straight or branched in nature. The chain may be substituted with auxochrome groups such as chloro, sulpho, hydroxyl, methoxy, and phenoxy groups. These substituted groups do not alter the fluorescent color but diminish slightly the intensity of the fluorescence of the compounds. The more preferred compounds do not contain substituted auxochrome groups. Groups which form the more particularly preferred aliphatic constituents are straight and branched chain, primary, secondary, and tertiary alkyl groups having from 1 to 6 carbon atoms. Such groups without limitation include methyl, ethyl, n-propyl, isopropyl, n-butyl, isobutyl, tert.-butyl, n-pentyl, isopentyl, diethylmethyl, and n-hexyl.

The terminal portion $Z_1$ of the amido and ureido groups represented by Y—$Z_1$ in Formula I may contain aromatic constituents containing not more than 2 benzene nuclei which are not more than one carbon atom removed from the Y radical.

An aromatic constituent represented by $R_1$, $R_2$, or $R_3$ in Formula II may be attached directly to the radical represented by Y in Formula I or it may be attached to an aliphatic constituent at the carbon atom of the aliphatic chain which is adjacent to the radical Y. An aromatic constituent may consist of 1 benzene nucleus as in a phenyl group or may contain 2 benzene nuclei which are independently attached as in a n-diphenyl group or fused together to provide a double ring as in a naphthyl group. An aromatic constituent may contain groups which are substituted on the ring or rings thereof including without limitation chloro, sulpho, hydroxyl, methyl, chloromethyl, methoxy, and phenoxy groups. Substituted groups which provide preferred compounds are chloro, methyl, and methoxy groups. Aromatic constituents which form preferred compounds include phenyl, n-diphenyl, p-tolyl, naphthyl, o-methoxyphenyl, p-methoxyphenyl, o-chlorophenyl, and p-chlorophenyl groups.

The aliphatic constituent represented by $R_2$ in Formula II may contain from 1 to 7, and preferably from 1 to 5, carbon atoms in a saturated carbon chain. The chain may be straight or branched in nature. The chain may be substituted with auxochrome groups as in the case of the aliphatic group described above not substituted with an aromatic constituent. Aliphatic groups which form preferred compounds include straight and branched chain, primary, secondary, and tertiary alkyl groups having from 1 to 5 carbon atoms. Such groups include methyl, ethyl, n-propyl, isopropyl, n-butyl, isobutyl, tert.-butyl, n-pentyl, isopentyl, and diethylmethyl groups.

Specific compounds embraced by the invention and represented by Formula I shown above include:

2-(2'-hydroxy-5'-formamido-phenyl) benzoxazole,
2-(2'-hydroxy-5'-acetamido-phenyl) benzoxazole,
2-(2'-hydroxy-5'-propionamido-phenyl) benzoxazoles,
2-(2'-hydroxy-5'-butyramido-phenyl) benzoxazoles,
2-(2'-hydroxy-5'-hexanamido-phenyl) benzoxazoles,
2-(2'-hydroxy-5'-phenylacetamido-phenyl) benzoxazole,
2-(2'-hydroxy-5'-benzamido-phenyl) benzoxazole,
2-(2'-hydroxy-5'-phenylbenzamido-phenyl) benzoxazoles,
2-(2'-hydroxy-5'-naphthamido-phenyl) benzoxazoles,
2-(2'-hydroxy-5'-phenoxyacetamido-phenyl) benzoxazole,
2-(2'-hydroxy-5'-o-chlorobenzamido-phenyl) benzoxazole,
2-(2'-hydroxy-5'-o-anisamido-phenyl) benzoxazole,
2-(2'-hydroxy-5'-p-anisamido-phenyl) benzoxazole,
2-(2'-hydroxy-5'-ureido-phenyl) benzoxazole,
2-(2'-hydroxy-5'-methylureido-phenyl) benzoxazole,
2-(2'-hydroxy-5'-ethylureido-phenyl) benzoxazole,
2-(2'-hydroxy-5'-propylureido-phenyl) benzoxazoles,
2-(2'-hydroxy-5'-butylureido-phenyl) benzoxazoles,
2-(2'-hydroxy-5'-phentylureido-phenyl) benzoxazoles,
2-(2'-hydroxy-5'-hexylureido-phenyl) benzoxazoles,
2-(2'-hydroxy-5'-benzylureido-phenyl) benzoxazole,
2-(2'-hydroxy-5'-phenylureido-phenyl) benzoxazole,
2-(2'-hydroxy-5'-n-diphenylureido-phenyl) benzoxazole,
2-(2'-hydroxy-5'-biphenylureido-phenyl) benzoxazole,
2-(2'-hydroxy-5'-naphthylureido-phenyl) benzoxazole,
2-(2'-hydroxy-5'-phenoxyethylureido-phenyl) benzoxzole,
2-(2'-hydroxy-5'-o-methoxyphenylureido-phenyl) benzoxzole,
2-(2'-hydroxy-5'-o-chlorophenylureido-phenyl) benzoxazole,
2-(2'-hydroxy-5'-formamido-phenyl) benzothiazole,
2-(2'-hydroxy-5'-acetamido-phenyl) benzothiazole,
2-(2'-hydroxy-5'-propionamido-phenyl) benzothiazoles,
2-(2'-hydroxy-5'-butyramido-phenyl) benzothiazoles,
2-(2'-hydroxy-5'-pentanamido-phenyl) benzothiazoles,
2-(2'-hydroxy-5'-hexanamido-phenyl) benzothiazoles,
2-(2'-hydroxy-5'-phenylacetamido-phenyl) benzothiazoles,
2-(2'-hydroxy-5'-benzamido-phenyl) benzothiazole,
2-(2'-hydroxy-5'-phenylbenzamido-phenyl) benzothiazoles,
2-(2'-hydroxy-5'-naphthamido-phenyl) benzothiazoles,
2-(2'-hydroxy-5'-phenoxyacetamido-phenyl) benzothiazole,
2-(2'-hydroxy-5'-o-chlorobenzamido-phenyl) benzothiazole,
2-(2'-hydroxy-5'-o-anisamido-phenyl) benzothiazole,
2-(2'-hydroxy-5'-p-anisamido-phenyl) benzothiazole,
2-(2'-hydroxy-5'-ureido-phenyl) benzothiazole,
2-(2'-hydroxy-5'-methylureido-phenyl) benzothiazole,
2-(2'-hydroxy-5'-ethylureido-phenyl) benzothiazole,
2-(2'-hydroxy-5'-propylureido-phenyl) benzothiazoles,
2-(2'-hydroxy-5'-butylureido-phenyl) benzothiazoles,
2-(2'-hydroxy-5'-phentylureido-phenyl) benzothiazoles,
2-(2'-hydroxy-5'-hexylureido-phenyl) benzothiazoles,
2-(2'-hydroxy-5'-benzylureido-phenyl) benzothiazole,
2-(2'-hydroxy-5'-phenylureido-phenyl) benzothiazole,
2-(2'-hydroxy-5'-n-diphenyl-phenyl) benzothiazole,
2-(2'-hydroxy-5'-biphenylureido-phenyl) benzothiazole,
2-(2'-hydroxy-5'-naphthylureido-phenyl) benzothiazoles,
2-(2'-hydroxy-5'-phenoxymethylureido-phenyl) benzothiazole,
2-(2'-hydroxy-5'-o-methoxyphenylureido-phenyl) benzothiazole,
2-(2'-hydroxy-5'-p-methoxyphenylureido-phenyl) benzothiazole,
2-(2'-hydroxy-5'-o-chlorophenylureido-phenyl) benzothiazole.

The compounds of the invention by virtue of the particular substitution of hydroxyl groups and amido or ureido groups in the 2 and 5 positions, respectively, of the phenyl constituent, are characterized by a distinctive color in ultraviolet light. Such derivatives of 2-(o-hydroxyphenyl)benzoxazole exhibit a bright yellow when illuminated with ultraviolet light. The derivatives of 2-(o-hydroxyphenyl)benzothiazole are characterized by a bright orange fluorescence in ultraviolet light. All oxazole and thiazole derivatives embraced by the invention are colorless or nearly colorless in natural light.

Some properties of the compounds of the present invention are determined by the nature of the terminal portion of the amido or ureido group of the compounds. Such properties include the ability to sublime and the resistance to chemical attack and, particularly, resistance to attack by alkalies. For example, when the terminal portion contains an aromatic group not more than 1 carbon atom removed from the amido or ureido group, the compound is characterized by non-subliming and alkali-resistant properties. Of particular importance is the fact that such compounds do not sublime when subjected to temperatures in the range encountered in commercial laundering operations. During pressing and ironing in commercial laundering processes articles are generally subjected to temperatures ranging up to 375° F. The above aromatic derivatives embraced by the present invention do not sublime at temperatures below about 450° F.

In addition, such compounds containing aromatic substituents not more than 1 carbon atom removed from the amido or ureido group are non-reactive with substances usually encountered in normal commercial laundering operations. More particularly, these derivatives do not react with dilute alkaline solutions. These derivatives are characterized by resistance to attack from a boiling 5% sodium hydroxide solution.

Accordingly, compounds embraced by the present invention which are excellently adapted for utilization in laundry marking ink compositions may be represented by the formula:

(III)
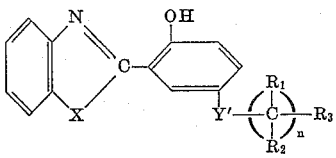

wherein X is an atom selected from the group consisting of oxygen and sulfur atoms, Y represents a radical selected from the group consisting of —NHCO— and —NHCON—,

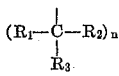

$n$ is a number selected from the group consisting of 0 and 1, $R_1$ represents a radical selected from the group comprising hydrogen and an aromatic group containing not more than 2 benzene nuclei, $R_2$ represents a radical selected from the group having from 1 to 7 carbon atoms in a saturated carbon chain, and an aromatic group containing not more than 2 benzene nuclei, and $R_3$ represents an aromatic group containing not more than 2 benzene nuclei.

The terminal portion

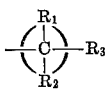

of the amido and ureido groups represented by

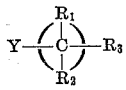

in Formula III may be any of the corresponding groups discussed above with respect to Formula II.

When $R_2$ in a compound is an aliphatic group, it preferably contains from 1 to 5 carbon atoms. More preferably, an aliphatic $R_2$ group consists of an alkyl group containing from 1 to 5 carbon atoms. Preferred alkyl groups are the preferred groups given above with respect to Formula II.

Substituted groups may be present on the ring or rings of the aromatic constituents represented by $R_1$, $R_2$, and $R_3$ in Formula III. Such groups are those given above with respect to Formula II. Substituted groups which provide preferred compounds include chloro and methoxy groups.

More preferably, the groups represented by $R_1$ and $R_2$ in Formula III are both hydrogen when $n$ is 1.

Aromatic constituents which are more particularly preferred may be represented by the formula —Ar—$R_4$, wherein Ar represents an aryl radical having not more than 2 benzene nuclei and $R_4$ represents a group selected from the group consisting of hydrogen, chloro, and methoxy groups.

Terminal groups of amido and ureido groups which provide preferred compounds include phenyl, n-diphenyl, naphthyl, o-methoxyphenyl, p-methoxyphenyl, o-chlorophenyl, and p-chlorophenyl groups.

Specific compounds particularly adapted and preferred for utilization in marking ink compositions are:

2-(2'-hydroxy-5'-benzamido-phenyl) benzoxazole,
2-(2'-hydroxy-5'-naphthamido-phenyl) benzoxazole,
2-(2'-hydroxy-5'-phenylacetamido-phenyl) benzoxazole,
2-(2'-hydroxy-5'-o-anisamido-phenyl) benzoxazole,
2-(2'-hydroxy-5'-p-anisamido-phenyl) benzoxazole,
2-(2'-hydroxy-5'-phenylureido-phenyl) benzoxazole,
2-(2'-hydroxy-5'-biphenylureido-phenyl) benzoxazole,
2-(2'-hydroxy-5'-o-methoxyphenylureido-phenyl) benzoxazole,
2-(2'-hydroxy-5'-o-chlorophenylureido-phenyl) benzoxazole,
2-(2'-hydroxy-5'-naphthylureido-phenyl) benzoxazole,
2-(2'-hydroxy-5'-benzamido-phenyl) benzothiazole,
2-(2'-hydroxy-5'-naphthamido-phenyl) benzothiazole,
2-(2'-hydroxy-5'-phenylacetamido-phenyl) benzothiazole,
2-(2'-hydroxy-5'-o-anisamido-phenyl) benzothiazole,
2-(2'-hydroxy-5'-p-anisamido-phenyl) benzothiazole,
2-(2'-hydroxy-5'-phenylureido-phenyl) benzothiazole,
2-(2'-hydroxy-5'-biphenylureido-phenyl) benzothiazole,
2-(2'-hydroxy-5'-o-methoxyphenylureido-phenyl) benzothiazole,
2-(2'-hydroxy-5'-o-chlorophenylureido-phenyl) benzothiazole
2-(2'-hydroxy-5-naphthylureido-phenyl) benzothiazole.

When the terminal portion of the amido or ureido group of a particular compound of the present invention is a hydrogen atom or an aliphatic constituent, the compound may sublime in the range of temperatures normally encountered in commercial laundering operations and react to some degree with dilute alkaline solutions. However, these derivatives by virtue of their distinctive color in ultraviolet light find utility in marking inks for decorating various materials such as paper and the like which are not to be subjected to severe conditions.

The fluorescent compounds of the present invention may be employed in conjunction with a suitable organic carrier to provide marking ink compositions. Generally, a carrier comprises a binder dissolved in a solvent.

The particular combination of binder and solvent employed in a specific ink formulation is determined, inter alia, by the method contemplated for removal of the solvent from the wet ink print, the contemplated end use of the ink with respect to such characteristics as gloss, flexibility, odor, resistance to scratch, rub abrasion, and chemical action, and the composite composition of the pigment mixture if more than one pigment is employed. When the normally colorless fluorescent pigments of the invention are employed in combination with a normally colored pigment or pigments, it will be apparent that the requirements on the transparency of the vehicle are less srtingent than when the normally colorless fluorescent pigments are employed to effect an invisible print detectable only under ultraviolet light.

Carriers which are suitable for the present invention include any of the organic liquid vehicles known to the art for marking inks.

Solvents which are suitable for utilization with the pigments of the present invention include those which are volatile at normal temperatures and those which are not. Such solvents include, without limitation, hydrocarbons, such as naphthas, alcohols, such as ethanol, ethers, such as n-propylethyl ether and ethylene glycol monobutyl ether, and glycols, such as propylene glycol and diethylene glycol.

Binders which are suitable include, without limitation, gums, cumarone-indene resins, modified resins, such as condensation products of rosin or terpene hydrocarbons with unsaturated polybasic acids, alkyd resins, urea-formaldehyde resins, and cellulose ethers and esters.

In addition, the pigments of the invention may also be employed with organic vehicles which do not contain solvents such as those comprising linseed oil or tung oil which dry by oxidation.

In a preferred application of the fluorescent pigments of the invention adapted for utilization in laundry marking inks, the amido and ureido derivatives described above and represented by Formula III are employed with a carrier consisting of a clear varnish comprising an organic solvent which is miscible with water and non-volatile at normal temperatures and a binder which is soluble in the solvent and a limited quantity of water but not in the solvent and an unlimited quantity of water. Accordingly, upon the application of water to a wet ink print effected with such a formulation, the solvent is removed by the water, and the binder containing the pigment is left on the surface of the material to which the wet ink is applied. Solvents which may be employed include higher glycols, such as propylene glycol, polyglycols, such as diethylene glycol, and ethers formed by the condensation of glycols or polyglycols with low molecular weight alkanols, such as ethylene glycol monobutyl ether and bis[2-(2′-methoxy-ethoxy)ethyl] ether. The more preferred solvent is bis[2-(2′-methoxy-ethoxy)ethyl] ether.

Materials which may be employed as binders in the carrier include, without limitation, cellulose derivatives, such as methyl, ethyl, and benzyl cellulose, and cellulose acetate, acetobutyrate, and acetopropionate. Cellulose acetate provides a preferred binder.

The composition of a preferred carrier comprises from about 1 to about 8 parts, preferably from about 2 to about 5 parts, cellulose acetate binder and from about 65 to about 85 parts, preferably from about 70 to about 80 parts, bis[2-(2′-ethoxy-methoxy)ethyl] ether solvent.

The amount of fluorescent pigment which is present in an ink formulation of the present invention depends, inter alia, upon the particular solvent-binder combination employed, and more particularly, the ability of the solvent to take the binder into solution, the ability of the binder to disperse the pigment, and the desired consistency of the formulation. The consistency of a formulation containing a given amount of binder and pigment usually may be varied by varying the amount of binder solvent. By virtue of the intensity of the fluorescence of the pigments, a large pigment concentration in a binder is not required to obtain the desired markings. Usually, the quantity of the fluorescent pigment is in the range of about 5 to about 150 parts per 100 parts binder, and preferably from about 15 to about 60 parts per 100 parts binder.

It will be apparent to one skilled in the art that other ingredients may also be added to the ink formulations of the invention without departing from the scope of the invention. Such ingredients may include plasticizers for the binders, dispersing agents for the pigments, and the like.

In the preparation of the ink formulations of the invention the separate ingredients, comprising generally the pigment, solvent, and binder, are added together and admixed with agitation until the solvent dissolves the binder. Then the mixture is passed through a colloidal mill or homogenizer to effect an adequate dispersion of the pigment throughout the binder.

Markings effected by ink formulations of the present invention are readily detectable when illuminated with ultraviolet light. The yellow or orange fluorescence of the markings provide a contrast with the color of the marked material. The markings are distinguishable even against background fluorescence due to the presence of optical brighteners on the marked materials.

Markings effected by ink formulations of the invention comprising a clear binder and a fluorescent pigment of the invention employed as the only pigment, such as the above described laundry marking inks, are in addition invisible in normal light.

In the preparation of the oxazole derivatives of the present invention o-aminophenol may be reacted with 5-nitrosalicylaldehyde in the presence of triethylphosphate and glacial acetic acid at about room temperature to provide an intermediate Schiff's base. With the temperature of the mixture maintained below 60° C., the Schiff's base is oxidized with lead tetraacetate to 2-(2′-hydroxy-5′-nitrophenyl)benzoxazole which is separated by cooling and filtering. The nitro group of the intermediate oxazole is reduced to an amino group with powdered zinc in the presence of glacial acetic acid to form 2-(2′-hydroxy-5′-aminophenyl)benzoxazole. The amino derivative is then converted to the desired amido or ureido product by reaction with the requisite acid anhydride, acyl halide, or isocyanate. The benzothiazole products of the invention may be prepared by a similar procedure with the exception of a substitution of o-amino thiophenol for o-aminophenol as the starting material.

Having described the invention, the following examples are given to more fully illustrate the compounds of the invention, and their utilization in ink formulations. The examples are not intended to limit the scope of the invention and are provided solely for illustration purposes.

EXAMPLE I

2-2′-(Hydroxy-5′-Acetamido-Phenyl) Benzoxazole

About 109 parts o-aminophenol are dissolved in about 1000 parts triethyl phosphate at room temperature, and about 200 parts 5-nitro-salicylaldehyde are stirred into the solution. Then after 10 min. add 1000 parts glacial acetic acid and stir for 15 min. Maintaining the temperature of the stirred reaction mixture below 60° C., add about 600 parts lead tetracetate. The exothermic oxidation reaction is complete 15 min. after the latter addition. About 100 parts ethylene glycol are added, and the reaction mixture is cooled to about 30° C. whereupon crystals of 2-(2′-hydroxy-5′-nitrophenyl) benzoxazole are formed. The oxazole intermediate is filtered and washed with, first, alcohol and then water.

The filtered oxazole intermediate is then added to about 1500 parts glacial acetic acid, and about 400 parts of powdered zinc are stirred into the mixture in increments over a period of about 30 min. while the temperature of the exothermic mixture is held below 80° C. The reaction is allowed to continue for one hour after which time the reaction mixture is diluted to twice its volume with water. About 20 parts activated charcoal and about 40 parts diatomaceous earth are added. The resulting mixture is stirred until its temperature drops to 35° C. and is then filtered. The resulting filter cake is washed with about 50% acetic acid. The filtrate is cooled to about 10° C. or below and then the pH is adjusted to about 7 with ammonium hydroxide. Crystals of 2-(2′-hydroxy-5′-aminophenyl) benzoxazole separate and are filtered, washed with water, and dried.

About 100 parts 2-(2′-hydroxy-5′-aminophenyl) benzoxazole are dissolved in about 1000 parts pyridine, and about 35 parts acetyl chloride are added with stirring at room temperature. The solution is heated to about 75° C. and held there with stirring for about 15 min., whereupon crystals of 2-(2′-hydroxy-5′-acetamido-phenyl) benzoxazole separate from solution. If necessary water is added to induce crystallization. The mixture is cooled, and the product is filtered and washed with alcohol or acetone and dried. A resultant product consisting of a cream to white powder is provided which fluoresces an intense yellow in ultraviolet light.

EXAMPLE II

2-(2′-Hydroxy-5′-Acylamido-Phenyl) Benzoxazoles

The procedure of Example I is repeated with the exception of substituting various aliphatic or aromatic acid anhydrides or acyl halides for acetyl chloride. The results of the preparations are reflected in Table I.

TABLE I

| Anhydride or Acyl Chloride of— | 5′-Acylamido Group | Fluorescent Color |
|---|---|---|
| formic acid | formamido | yellow. |
| n-hexanoic acid | hexanamido | Do. |
| phenylacetic acid | phenylacetamido | Do. |
| phenoxyacetic acid | phenoxyacet-amido. | Do. |
| benzoic acid | benzamido | Do. |
| naphthoic acid | naphthamido | Do. |
| o-anisic acid | o-anisamido | Do. |
| p-anisic acid | p-anisamido | Do. |

EXAMPLE III

*2-(2'-Hydroxy-5'-Methylureido-Phenyl) Benzoxazole*

The procedure of Example I is repeated down to the formation of the hydroxy-aminophenyl benzoxazole intermediate. Then about 100 parts of the resultant benzoxazole derivative are dissolved in about 2000 parts triethyl phosphate, and about 75 parts methyl isocyanate are added with stirring at room temperature. The solution is heated to about 125° C. and held there with stirring for about 15 min. whereupon crystals of 2-(2'-hydroxy-5'-acetamido-phenyl) benzoxazole separate from the solution. The mixture is cooled, and the precipitated product is filtered and washed with acetone. The final product may be further purified by slurrying in triethyl phosphate and reheating to about 125° C. The solution is cooled and filtered, and the separated crystals are washed with acetone and dried. A resultant product consisting of a cream to white powder is provided which fluoresces an intense yellow in ultraviolet light.

EXAMPLE IV

*2-(2'-Hydroxy-5'-Aromatic Ureido-Phenyl) Benzoxazoles*

The procedure of Example III is repeated with the exception of substituting various aromatic isocyanates for methyl isocyanate. The results of the preparations are reflected in Table II.

TABLE II

| Isocyanate | 5'-Ureido Group | Fluorescent Color |
| --- | --- | --- |
| phenyl | phenylureido | yellow. |
| biphenyl | biphenylureido | Do. |
| naphthyl | naphthylureido | Do. |
| n-diphenyl | n-diphenylureido | Do. |
| o-methoxyphenyl | o-methoxyphenylureido | Do. |
| o-chlorophenyl | o-chlorophenylureido | Do. |

EXAMPLE V

*2-(2'-Hydroxy-5'-Acetamido-Phenyl) Benzothiazole*

The procedure of Example I is repeated with the exception of substituting o-aminothiophenol for o-aminophenol as a starting material. A product is provided which is a cream to white powder and is characterized by an intense orange fluorescence in ultraviolet light.

EXAMPLE VI

*2-(2'-Hydroxy-5'-Acylamido-Phenyl) Benzothiazoles*

The procedure of Example V is repeated with the exception of substituting various aliphatic or aromatic acid anhydrides or acyl halides for acetyl chloride. The results of the preparations are reflected in Table III.

TABLE III

| Anhydride or Acyl Chloride of— | 5'-Acylamido Group | Flourescent Color |
| --- | --- | --- |
| formic acid | formamido | orange. |
| n-hexanoic acid | hexanamido | Do. |
| phenylacetic acid | phenylacetamido | Do. |
| phenoxyacetic acid | phenoxyacetamido | Do. |
| benzoic acid | benzamido | Do. |
| naphthoic acid | naphthamido | Do. |
| o-anisic acid | o-anisamido | Do. |
| p-anisic acid | p-anisamido | Do. |

EXAMPLE VII

*2-(2'-Hydroxy-5'-Methylureido-Phenyl) benzothiazole*

The procedure of Example III is repeated with the exception of substituting o-aminothiophenol for o-aminophenol as a starting material. The cream to white powdery product which is provided is characterized by an intense orange fluorescence in ultraviolet light.

EXAMPLE VIII

*2-(2'-Hydroxy-5'-Aromatic Ureido-Phenyl) benzothiazoles*

The procedure of Example VII is repeated with the exception of substituting various aromatic isocyanates for methyl isocyanate. The results of the preparations are reflected in Table IV.

TABLE IV

| Isocyanate | 5'-Ureido Group | Fluorescent Color |
| --- | --- | --- |
| phenyl | phenylureido | orange. |
| biphenyl | biphenylureido | Do. |
| naphthyl | naphthylureido | Do. |
| n-diphenyl | n-diphenylureido | Do. |
| o-methoxyphenyl | o-methoxyphenylureido | Do. |
| o-chlorophenyl | o-chlorophenylureido | Do. |

EXAMPLE IX

A suitable laundry marking ink formulation is provided by combining the following ingredients in the indicated proportions:

| Ingredients | Parts by Weight |
| --- | --- |
| Bis[2-(2'-methoxy-ethoxy)ethyl]ether | 75 |
| Triethyl phosphate | 25 |
| Cellulose acetate | 2.5 |
| Silicon dioxide | 1–2 |
| 2-[2'-hydroxy-5'(1''-naphthyl)ureidophenyl]benzoxazole | 0.5–1 |

The cellulose acetate constituent is a filtered, powdered product produced by Eastman and designated commercially as E-383-50. It is further characterized by a viscosity in the range of about 35 to about 55 seconds as determined by ASTM method D–1343–54T, an average acetyl content of about 38.3%, and an average combined acetic acid content of about 53.5%.

The silicon dioxide constituent is a finely divided silica produced by Godfrey L. Cabot, Inc., and designated commercially as CAB-O-Sil M-5. It is characterized by a particle size in the range of about 0.015 to about 0.020 micron, a free moisture content measured at about 105° C. in the range of about 0.2 to about 1.5%, and an apparent bulk density in the range of about 2.5 to about 3.5 lbs. per cu. ft.

The ingredients are mixed together for a period requisite for the cellulose acetate to be dissolved by the bis-[2(2'-methoxy-ethoxy)ethyl]ether. The mixture is then passed through a colloidal mill or homogenizer to disperse the benzoxazole pigment throughout the vehicle.

The above formulation containing the dispersed pigment was printed upon ordinary and brightened textile fibers to effect an invisible marking in natural light. Under ultraviolet illumination the intensely yellow fluorescent markings on both the ordinary untreated fibers and the brightened textile fibers contrasted sharply with the background colors of the fibers and were easily detectable.

The fibers containing the printed markings were subjected to temperatures ranging up to about 375° F. and were soaked in a boiling 5% sodium hydroxide solution for a period of about 15 min. Subsequent illumination of the fibers with ultraviolet light revealed that the markings were still easily detectable, sharp, and unaffected by the temperature and caustic treatments.

EXAMPLE X

The procedure of Example IX was repeated with the exception of substituting the amido and ureido derivatives of 2-(0-hydroxyphenyl)benzoxazole and benzothiazole shown in Tables I, II, III, and IV of Examples II, IV, VI, and VIII, respectively, which contain aromatic constituents at the terminal portion of the amido and ureido groups which are not more than 1 carbon atom removed from the carbonyl of the amido group and the terminal nitrogen of the ureido group. Such derivatives which were tested included 2-[2'-hydroxy-5'-(1"-naphthylureido)-phenyl]benzothiazole, 2-[2'-hydroxy-5'-(1"-naphthamido)-phenyl]benzothiazole, 2-[2-hydroxy-5'-(1"-naphthamido)-phenyl]benzoxazole, and those oxazole and thiazole derivatives having the following groups substituted in the 5 position of the phenyl constituent: phenylacetamido, benzamido, o-anisamido, p-anisamido, phenylureido, biphenylureido, o-methoxyphenylureido and o-chlorophenylureido. All of the ink formulations thereby produced effected invisible markings on textile fabrics which were not destroyed when the fabrics were subjected to temperatures ranging up to about 375° F. and to caustic attack by a boiling 5% sodium hydroxide solution for 15 min.

The ink formulations prepared with oxazole derivatives produced prints which were characterized by an intense yellow fluorescence in ultraviolet light, and those containing thiazole derivates produced sharply contrasting orange fluorescent markings which were readily detectable.

This application is a division of McCafferty application Serial No. 42,959, filed July 15, 1960.

I claim:

1. An ink composition consisting essentially of (a) an organic carrier comprising an organic binder, and (b) a normally colorless, fluorescent pigment represented by the formula

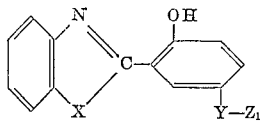

wherein X represents an atom selected from the group consisting of oxygen and sulfur atoms, $Z_1$ represents a radical selected from the group consisting of (a) hydrogen,
(b) an aliphatic group having from 1 to 8 carbon atoms in a saturated carbon chain, and
(c) a radical represented by the formula

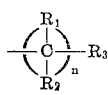

wherein $n$ is a number selected from the group consisting of 0 and 1, $R_1$ represents a radical selected from the group consisting of hydrogen and an aromatic group having not more than 2 benzene nuclei, $R_2$ represents a radical selected from the group consisting of hydrogen, an aliphatic group having from 1 to 7 carbon atoms in a saturated carbon chain, and an aromatic group having not more than 2 benzene nuclei, and $R_3$ represents an aromatic group having not more than 2 benzene nuclei, and Y represents a radical selected from the group consisting of —NHCO— and —NHCONZ$_2$—, wherein $Z_2$ represents a radical selected from the group consisting of hydrogen and $Z_1$.

2. An ink composition according to claim 1 wherein the amount of the fluorescent pigment is in the range of from about 5 to about 150 parts per 100 parts binder.

3. An ink composition according to claim 1 wherein the amount of the pigment is in the range of from about 15 to about 60 parts per 100 parts binder.

4. An ink composition according to claim 3 wherein the organic binder comprises a cellulose derivative.

5. An ink composition according to claim 4 wherein the organic carrier comprises from about 1 to about 8 parts of cellulose acetate and from about 65 to about 85 parts of bis[2-(2'-ethoxy-methoxy)ethyl]ether.

6. An ink composition according to claim 5 wherein the amount of cellulose acetate is in the range of from about 2 to about 5 parts and the amount of bis[2-(2'-ethoxy-methoxy)ethyl]ether is in the range of from about 70 to about 80 parts.

7. An ink composition consisting essentially of from about 0.5 to about 1 part of 2-[2'-hydroxy-5'(1"'-naphthyl)ureido-phenyl]benzoxazole, about 2.5 parts of cellulose acetate, and about 75 parts of bis[2-(2'-ethoxy-methoxy)ethyl]ether.

8. An ink composition consisting essentially of from about 0.5 to about 1 part of 2-[2'-hydroxy-5'-(1"'-naphthyl)ureido-phenyl]benzothiazole, about 2.5 parts of cellulose acetate, and about 75 parts of bis[2-(2'-ethoxy-methoxy)ethyl]ether.

9. An ink composition consisting essentially of (a) an organic carrier comprising an organic binder, and (b) from about 5 to about 150 parts per 100 parts binder of 2-(2'-hydroxy-5'-benzamido-phenyl)benzoxazole.

10. An ink composition consisting essentially of (a) an organic carrier comprising an organic binder and (b) from about 5 to about 150 parts per 100 parts binder of 2-(2'-hydroxy-5'-nipthamidophenyl)benzoxazole.

11. An ink composition consisting essentially of (a) an organic carrier comprising an organic binder and (b) from about 5 to about 150 parts per 100 parts binder of 2-(2'-hydroxy-5'-o-anisamidophenyl)benzoxazole.

12. An ink composition consisting essentially of (a) an organic carrier comprising an organic binder and (b) from about 5 to about 150 parts per 100 parts binder of 2-(2'-hydroxy-5'-phenylacetamidophenyl)benzoxazole.

13. An ink composition consisting essentially of (a) an organic carrier comprising an organic binder and (b) from about 5 to about 150 parts per 100 parts binder of 2-(2'-hydroxy-5'-p-anisamidophenyl)benzoxazole.

14. An ink composition consisting essentially of (a) an organic carrier comprising an organic binder and (b) from about 5 to about 150 parts per 100 parts binder of 2-(2'-hydroxy-5'-phenylureidophenyl)benzoxazole.

15. An ink composition consisting essentially of (a) an organic carrier comprising an organic binder and (b) from about 5 to about 150 parts per 100 parts binder of 2-(2'-hydroxy-5'-biphenylureidophenyl)benzoxazole.

16. An ink composition consisting essentially of (a) an organic carrier comprising an organic binder and (b) from about 5 to about 150 parts per 100 parts binder of 2-(2'-hydroxy-5' - o - methoxyphenylureidophenyl)benzoxazole.

17. An ink composition consisting essentially of (a) an organic carrier comprising an organic binder and (b) from about 5 to about 150 parts per 100 parts binder of 2-(2'-hydroxy-5'-o-chlorophenylureidophenyl)benzoxazole.

18. An ink composition consisting essentially of (a) an organic carrier comprising an organic binder and (b) from about 5 to about 150 parts per 100 parts binder of 2-(2'-hydroxy-5' - naphthylureidophenyl)benzoxazole.

19. An ink composition consisting essentially of (a) an organic carrier comprising an organic binder and (b) from about 5 to about 150 parts per 100 parts binder of 2-(2'-hydroxy-5'-benzamidophenyl)benzothiazole.

20. An ink composition consisting essentially of (a) an organic carrier comprising an organic binder and (b) from about 5 to about 150 parts per 100 parts binder of 2 - (2' - hydroxy-5'-naphthamidophenyl)benzothiazole.

21. An ink composition consisting essentially of (a) an organic carrier comprising an organic binder and (b) from about 5 to about 150 parts per 100 parts binder of 2 - (2' - hydroxy - 5'-phenyl-acetamidophenyl)benzothiazole.

22. An ink composition consisting essentially of (a) an organic carrier comprising an organic binder and (b) from about 5 to about 150 parts per 100 parts binder of 2-(2'-hydroxy-5'-o-anisamidophenyl)benzothiazole.

23. An ink composition consisting essentially of (a) an organic carrier comprising an organic binder and (b) from about 5 to about 150 parts per 100 parts binder of 2-(2'-hydroxy-5'-p-anisamidophenyl)benzothiazole.

24. An ink composition consisting essentially of (a) an organic carrier comprising an organic binder and (b) from about 5 to about 150 parts per 100 parts binder of 2-(2'-hydroxy-5'-phenylureido-phenyl)benzothiazole.

25. An ink composition consisting essentially of (a) an organic carrier comprising an organic binder and (b) from about 5 to about 150 parts per 100 parts binder of 2-(2'-hydroxy-5' - biphenylureido - phenyl)benzothiazole.

26. An ink composition consisting essentially of (a) an organic carrier comprising an organic binder and (b) from about 5 to about 150 parts per 100 parts binder of 2-(2'-hydroxy-5'-o-methoxyphenylureido-phenyl)benzothiazole.

27. An ink composition consisting essentially of (a) an organic carrier comprising an organic binder and (b) from about 5 to about 150 parts per 100 parts binder of 2-(2'-hydroxy-5'-o-chlorophenylureido-phenyl)benzothiazole.

28. An ink composition consisting essentially of (a) an organic carrier comprising an organic binder and (b) from about 5 to about 150 parts per 100 parts binder of 2-(2'-hydroxy-5'-naphthylureido - phenyl)benzothiazole.

References Cited in the file of this patent

UNITED STATES PATENTS

| | | |
|---|---|---|
| 2,267,758 | Sell | Dec. 30, 1941 |
| 2,734,871 | McCafferty | Feb. 14, 1956 |
| 2,985,661 | Hein et al. | May 23, 1961 |

UNITED STATES PATENT OFFICE
CERTIFICATE OF CORRECTION

Patent No. 3,066,105                          November 27, 1962

Edward A. McCafferty

It is hereby certified that error appears in the above numbered patent requiring correction and that the said Letters Patent should read as corrected below.

In the grant, lines 2 and 12, and in the heading to the printed specification, lines 3 and 4, for "The National Marketing Machine Company", each occurrence, read -- The National Marking Machine Company --.

Signed and sealed this 17th day of November 1964.

(SEAL)
Attest:

ERNEST W. SWIDER                                    EDWARD J. BRENNER
Attesting Officer                                        Commissioner of Patents